United States Patent [19]
Folkins et al.

[11] Patent Number: 5,983,065
[45] Date of Patent: Nov. 9, 1999

[54] METHOD OF PRINTING SECURE DOCUMENTS

[75] Inventors: Jeffrey J. Folkins, Rochester; Michael M. Shahin; Craig A. Smith, both of Pittsford; Michael A. Parisi; Lingappa K. Mestha, both of Fairport, all of N.Y.

[73] Assignee: Xerox Corporation, Stamford, Conn.

[21] Appl. No.: 08/898,824

[22] Filed: Jul. 23, 1997

[51] Int. Cl.[6] .................................................. G03G 21/04
[52] U.S. Cl. ............................................. 399/366; 380/51
[58] Field of Search ...................... 399/366, 177, 399/51; 283/902; 380/51, 55; 430/109

[56] References Cited

U.S. PATENT DOCUMENTS

| | | | |
|---|---|---|---|
| 3,852,088 | 12/1974 | Godlewski et al. | 283/67 |
| 4,739,377 | 4/1988 | Allen | 355/133 |
| 4,791,449 | 12/1988 | Foley et al. | 399/366 |
| 5,084,205 | 1/1992 | Auslander | 252/301.16 |
| 5,087,507 | 2/1992 | Heinzer | 428/195 |
| 5,208,630 | 5/1993 | Goodbrand et al. | 355/201 |
| 5,225,900 | 7/1993 | Wright | 358/75 |
| 5,289,547 | 2/1994 | Ligas et al. | 382/7 |
| 5,291,243 | 3/1994 | Heckman et al. | 355/201 |
| 5,385,803 | 1/1995 | Duff et al. | 430/138 |
| 5,425,978 | 6/1995 | Berneth et al. | 428/195 |
| 5,554,480 | 9/1996 | Patel et al. | 430/137 |
| 5,740,514 | 4/1998 | Natsudaira | 399/366 |
| 5,759,729 | 6/1998 | Martin et al. | 430/106 |
| 5,807,625 | 9/1998 | Amon et al. | |

FOREIGN PATENT DOCUMENTS

| | | |
|---|---|---|
| 586093 | 3/1994 | European Pat. Off. . |
| 58-014842 | 1/1983 | Japan . |
| 1-201677 | 8/1989 | Japan . |
| 3-056972 | 3/1991 | Japan . |
| 5-289575 | 11/1993 | Japan . |
| 7-225488 | 8/1995 | Japan . |

*Primary Examiner*—Robert Beatty
*Attorney, Agent, or Firm*—John L. Haack

[57] ABSTRACT

A method including:

- providing a facility with at least one controlled access electronic printing machine;
- printing original documents with the controlled access electronic printing machine, wherein printed images formed thereby arise from marking materials containing at least one photoactive additive;
- equipping all uncontrolled access reprographic devices within the facility with a secure illumination source capable of exposing an object document with sufficient intensity to activate the photoactive additive; and
- illuminating the object document with the secure illumination source of the uncontrolled access reprographic device, wherein the object documents having original document images printed thereon cannot be copied or scanned in a normal copy or scan illumination interval.

21 Claims, No Drawings

METHOD OF PRINTING SECURE DOCUMENTS

REFERENCE TO COPENDING AND ISSUED PATENTS

Attention is directed to commonly owned and assigned U.S. Pat. Nos.: 5,633,109 (D/94557), entitled "Ink Compositions With Liposomes Containing Photochromic Compounds," and which application discloses an ink composition comprised of an aqueous liquid vehicle, a photochromic material, and a vesicle-forming lipid, wherein vesicles of the lipid are present in the ink; 5,551,973 (D/93253 I), entitled "Photochromic Microemulsion Ink Compositions," discloses an ink composition which comprises an aqueous phase, an oil phase, a photochromic material, and a surfactant, the ink exhibiting a liquid crystalline gel phase at a first temperature and a liquid microemulsion phase at a second temperature higher than the first temperature; and 5,593,486(D/94560), entitled "Photochromic Hot Melt Ink Compositions," discloses a hot melt ink composition comprising (a) an ink vehicle, the ink vehicle being a solid at about 25° C. and having a viscosity of from about 1 to about 20 centipoise at a temperature suitable for hot melt ink jet printing, the temperature being greater than about 45° C., (b) a photochromic material, and (c) an optional propellant.

Attention is directed to commonly owned and assigned copending U.S. applications: U.S. Ser. No. 08/567,786 (D/94599), entitled "Method for Embedding and Recovering Machine-Readable Information," and which application discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in the photochromic marking material from the first state to the second state; U.S. Ser. No. 08/567589 (D/94559), entitled "PHOTOCHROMIC ELECTROSTATIC TONER COMPOSITION" which discloses a toner composition for the development of electrostatic latent images which toner comprises particles of a mixture of a resin and a photochromic material.

The disclosures of the above mentioned patents and copending applications are incorporated herein by reference in their entirety.

BACKGROUND OF THE INVENTION

The present invention is generally directed to methods for printing secure documents. More specifically, the present invention, in embodiments, is directed to methodologies for printing secure documents, that is, for example, documents containing confidential or context sensitive information or graphical content, within a secure or restricted access facility, for example, a building, office, information or computation processing center, military operations installation, law firm, corporate strategy office, and the like facilities, where enhanced control of printed documentation flow and document authenticity and confidentially is desired. The present invention provides, in embodiments, methods for printing secure documents which minimizes or precludes the ability to reproduce, such as reprographically copy or electronically scan, an original secure document. Specifically, the present invention comprises, in embodiments, providing a facility with at least one controlled access electronic printing machine; printing original documents with the controlled access electronic printing machine, wherein printed images formed thereby are generated from marking materials containing at least one photoactive additive; equipping uncontrolled access replication or reprographic devices, or machines, that is, printers, copiers, scanners, mopiers, and the like devices within the facility with a secure illumination source capable of exposing an object document with sufficient intensity to activate the photoactive additive; and illuminating the object document with the illumination source of the uncontrolled access replication or reprographic device, wherein the object documents having original document images printed thereon cannot be reproduced, that is, for example, copied or scanned in a normal copy or scan illumination interval.

PRIOR ART

U.S. Pat. No. 5,289,547, discloses a method for authenticating articles wherein a mixture of at least two photochromic compounds that have different absorption maxima in the activated state and also preferably other different properties are incorporated in a carrier, for example, an ink, paint, fiber, or polymer used to form the authenticating display data on the article. The authenticating display data is subjected to various aspects of the authenticating method that may include preferential activation of less than all of the photochromic compounds, activation of all the photochromic compounds, and bleaching of all the photochromic compounds. Subsequent examination of the display data following the various activation and bleaching steps by verifying means enables the article to be authenticated.

U.S. Pat. No. 5,385,803, discloses a process for the authentication of documents which comprises generating developed documents in an electrophotographic apparatus, or in a laser printer with an encapsulated toner comprised of a core comprised of polymer, an optional pigment, and an infrared emitting component, and thereover a polymeric shell; and subjecting the document to an infrared reader whereby the infrared component is detected spectroscopically.

U.S. Pat. No. 5,208,630, discloses processes for the authentication of documents, such as tickets, credit cards, and the like, by generating these documents with a toner containing an infrared light absorbing component, which compositions are detectable when exposed to radiation outside the visible wavelength range, and more specifically, a wavelength of from between about 650 to 950 nanometers. The developed documents can be formed from latent electrostatic images in various known imaging apparatuses, such as the Xerox Corporation 5090, and thereafter developed with the toners illustrated in this patent followed by fusing.

U.S. Pat. No. 5,225,900, discloses a process for controlling a reproduction system comprising the scanning of an image to detect at least one taggant in at least one marking material forming the image; and issuing instructions to the reproduction system, wherein the instructions cause the reproduction system to take an action of (a) prohibiting reproduction of those portions of the image formed by the marking material containing at least one predetermined detected taggant, and reproduction of all other portions of the image; (b) prohibiting reproduction of any part of the image upon detecting of at least one predetermined taggant; (c) reproducing only those portions of the image formed by the marking material containing at least one predetermined taggant; (d) reproducing portions of the image formed by the marking material containing at least one predetermined taggant in a different manner from that in which the system reproduces portions of the image formed by the marking material not containing the at least one predetermined taggant, (e) identifying a source of the image on the basis of detection of at least one predetermined taggant. It is indicated in this patent that taggants may also provide security for important documents.

U.S. Pat. No. 5,084,205, discloses solution inks with an acceptable red fluorescent signal for machine detection while emitting a different visual color in white light.

U.S. Pat. No. 5,291,243, discloses a system for printing security documents which have copy detection or tamper resistance in plural colors with a single pass electronic printer printing an integrated image controlled by an image generation system which electronically generates a safety background image pattern with first and second interposed color patterns which is electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which become visible when copied, and/or are machine readable even in copies.

The disclosures of each of the above mentioned prior art patents are incorporated herein by reference in their entirety.

While known compositions and processes are suitable for their intended purposes, a need remains for improved electrostatic toner compositions and processes for securing documents. In addition, there is a need for toner compositions which enable production of photoactive documents wherein the stimulus required to invoke the photoactive response is relatively brief rather than continuous. Further, there is a need for processes and materials which enable the placement of encoded information on documents which is not detectable to the reader but which is readily machine detectable, that is, non recordable or non copyable.

SUMMARY OF THE INVENTION

Embodiments of the present invention, include:

overcoming deficiencies of the prior art by providing a method of printing secure documents comprising:

providing a facility with at least one controlled access electronic printing machine;

printing original documents with the controlled access electronic printing machine, wherein printed images formed thereby are generated from, or in embodiments arise exclusively from, marking materials containing at least one photoactive additive;

equipping substantially all uncontrolled access replication or reprographic devices, for example, digital printers, copiers, and mopiers with scanning capability, and light lens based copies, within the facility with a secure illumination source capable of exposing an object document with sufficient intensity to activate the photoactive additive; and illuminating the object document with the secure illumination source of the uncontrolled access replication or reprographic devices, wherein the object documents having original document images printed thereon are not reproducible, or cannot be copied or scanned in a normal copy or scan illumination interval.

An embodiment of the present invention provides a method comprising:

generating original images with a composition containing at least one photoactive component;

providing reprographic devices with a secure illumination source capable of exposing an object document with sufficient intensity to activate said photoactive additive; and illuminating said object document with said secure illumination source, wherein said object documents are not reproducible in a normal copy or scan illumination interval if said object document contains original image content.

It is also an embodiment of the present invention to provide electrostatic toner compositions with the above noted advantages.

It is yet another embodiment of the present invention to provide dry toner compositions with photoactive characteristics as illustrated herein.

It is another embodiment of the present invention to provide liquid toner compositions with photoactive characteristics as illustrated herein.

It is still another embodiment of the present invention to provide processes for preparing documents with images having photoactive characteristics which prevents the image content of the documents from being copied or scanned.

Another embodiment of the present invention is to provide toner compositions which enable production of photoactive documents wherein the stimulus required to invoke the photoactive response is relatively brief rather than continuous.

Yet another embodiment of the present invention is to provide processes and materials which enable the placement of encoded information on documents which encoded or secure information is not readily detectable by the visual observer or reader but which information is readily machine detectable, that is non copyable.

DETAILED DESCRIPTION OF THE INVENTION

The aforementioned and other objects of the present invention, or specific embodiments thereof, can be achieved by providing:

a method of printing secure documents comprising:

providing a facility, or facilities, such as buildings, and more specifically for example, a secure facility with limited and restricted access, with at least one controlled access electronic printing machine;

printing original or origin documents with the controlled access electronic printing machine, wherein printed images formed thereby arise in part, or preferably exclusively, from marking materials containing at least one photoactive additive;

equipping all, or substantially all uncontrolled access reprographic or replication devices, for example, devices that use light lens or scanning means for recording images, within the facility with a secure illumination source capable of exposing an object document with sufficient intensity to activate the photoactive additive; and illuminating the object document with the secure illumination source of the uncontrolled access reprographic or replication device, wherein the object documents having original document images printed thereon cannot be copied or scanned in a normal, that is a simultaneous or subsequent, copy or scan illumination interval.

The original or origin document can arise from a designated controlled access electronic printing machine or machines which contain and utilize marking materials containing at least one photoactive compound, and which machines are resident within or without the aforementioned facility.

The object document can be any document, of any origin, including the aforementioned original documents. The object documents can arise from within or without the aforementioned secure facility. The recordable image density of the object document is unaffected in the absence of original images containing the photoactive additive. The recordable image density of the original document is partially, for example in embodiments, from about 5 to about 95 relative percent, or entirely, that is about 95 to about 100 relative percent, obliterated by the presence of images containing the photoactive additive, so that copying or scanning of images containing the photoactive additive on original document images is prevented thereby securing original documents from unauthorized copying and copy distribution by, for example, light lens copying to form hard copy documents or digital scanning to form electronic documents, which hard copy or electronic documents are capable of being readily transmitted and transformed into various other documentary formats. Object documents that are also original documents are thereby distinguished from non-original documents so that an ability to copy original documents within the facility is effectively diminished or precluded.

Marking materials useful in the present invention include liquid inks and dry toner compositions which can be formulated in accordance with the present invention and include at least one photoactive compound as illustrated herein.

In embodiments, secure documents, include but are not limited to, for example, context sensitive documents, personal and performance history documents, financial documents, negotiable instruments, strategic or developmental plan documents, checks, tickets, and the like proprietary documents. Other secure documents include, for example, government, intelligence, security, financial, classified or registered, organizational, and the like hard copy documentation. The secure printing method of the present invention can be used to form secure documents and other documentary articles of commerce. Documents for which security may be desired include, for example, bank notes, currency, stock certificates, bonds, visas, passports, stamps, driver's licenses, permits, tickets, credit cards, cash withdrawal cards, check cards, phone cards, access cards, travelers checks, bank checks, remote access control cards, and the like instruments.

The controlled access electronic printing machine of the present invention, in embodiments, restricts printing privileges to only authorized individuals. Authorized individuals are, for example, those persons with authority or permission to create and generate original documents of a confidential or protected nature and which documents are intended to usually have limited or restricted distribution. In embodiments, an authorized individual is one who has been supplied with permitted access, for example, a proper password, key card, fingerprint recognition, autotron, and the like personal identifier. Original documents and information contained thereon can generally be of a confidential or sensitive nature and it is often desired to limit readership, replication, and dissemination of the information. The controlled access electronic printing machine selected in embodiments, employs a marking engine, for example, employing a dry, liquid, or combination thereof, marking materials, and corresponding development system, for forming secure images.

In embodiments of the present invention, illuminating any area of the object document is for an effective time interval, for example, typical exposure times for a tungsten illumination lamp are about 20 milliseconds for a 60 print per minute input scanning speed and a 6 mm exposure width. An ultraviolet (U.V.) illuminating lamp can easily be made wider or narrower as desired. In embodiments, illumination of the object document by the secure illumination source can be from, for example, about 1 to about 200 milliseconds in scanning mode. The illumination time is equal to the exposure width at the document divided by the scanning speed. However, application of the U.V. illumination source as a broad beam illumination rather than as part of the input scan can be accomplished and, in such a situation, effective illumination times could, in embodiments, extend to 2 to 3 seconds. An effective intensity of the aforementioned secure illumination source may be determined empirically and depends on a number of factors, for example, the concentration of the photoactive compound contained in the toner composition and the proximity of the secure source to the object document. An effective light wavelength for the secure illumination source, in embodiments, is at wavelengths which are shorter than those in the visible region of the electromagnetic spectrum, for example, wavelengths contained in the ultraviolet region of the electromagnetic spectrum, such as from about 250 to about 400 nanometers and below, so that any photoactive material contained in the printed images of the object document is sufficiently excited during the subsequent copy or scan illumination interval, and wherein the "secure" illumination occurs just prior to or during the subsequent "normal" copy or scan illumination interval of the area of the object document.

Printed images, of either original or object documents refers to, for example, alphanumeric characters, line art, bit maps, pictorial images, graphic images, holographic images, and the like images, and combinations thereof.

The reprographic and replication devices useful in the present invention as the uncontrolled access device are, for example, light lens copiers, digital copiers, copying printers, digital scanning-printing devices, digital input scanners with remote printing means, and the like devices.

The secure illumination source cannot be altered or disabled without authorization. This authorization, in embodiments, preferably is provided from the same source as the aforementioned authorization required for forming original secure documents containing the photoactive compound or compounds. In embodiments of the present invention, the secure illumination source is inaccessible and unalterable by a casual user or operator of the reprographic device; the secure illumination source can be selectively disabled and enabled by selected and authorized individuals, for example, for the purpose of idling, servicing or testing the secure document printing process; and, or the secure illumination source is selected to have a predominant wavelength or wavelengths which are other than and outside the typical human visible spectrum region.

In embodiments of the present invention, in the absorption spectrum of the photoactive compound, the compound becomes lighter or brighter when irradiated in the secure illumination source. The photoactive compound is present, for example, in an amount of from about 0.01 to about 50, and preferably from about 1 to about 25 weight percent based on the total weight of the solid toner or ink marking material selected for forming the original documents. The photoactive compound, in embodiments of the present invention, is a known photoactive material, such as, a photochromic, a fluorescent, a phosphorescent, an iridescent, a retroreflective, and mixtures thereof. The illuminated original document with images containing the photoactive compound or compounds produce a visible spectrum which is greater than the visible spectrum produced when the photoactive compound is absent. In embodiments, the photoactive compound can be, for example, a light emitting small organic, inorganic, or organometallic compound, or a light emitting polymer. In embodiments, the photoactive material preferably is a courmarin compound, for example, Coumarin 30 available from Eastman Kodak Co.

Examples of suitable photochromic materials include compounds that undergo heterolytic cleavage, such as spiropyrans and related compounds, and the like; compounds that undergo homolytic cleavage, such as bis-imidazole compounds, bistetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; and others. Examples of other suitable photochromic materials include those photochromic compounds which as a group absorb less light when excited, and also those compounds which as a group absorb greater amounts of light when excited. Various photochromic compounds and security applications thereof are disclosed in the aforementioned U.S. Pat. No. 5,289,547, the disclosure of which is incorporated herein in its entirety. The aforementioned groups of compounds are expected to be effective in charge area development (CAD) and dark area development (DAD) development systems.

Dry toner compositions useful in the present invention generally comprise a resin, a colorant or pigment, a photoactive material, and an optional charge control agent. The photochromic material is present in any amount effective to impart to the toner or ink particles the desired color and intensity under the appropriate illumination conditions. Typically, the photoactive material is present in the toner in an amount of from about 1 to about 20 percent by weight, and preferably from about 2 to about 10 percent by weight.

Typical toner resins include polyesters, such as those disclosed in U.S. Pat. No. 3,590,000, the disclosure of which is totally incorporated herein by reference, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated monoolefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, n-octyl acrylate, 2-chloroethyl acrylate, phenyl acrylate, methyl methacrylate, and the like; acrylonitrile, acrylamide, vinyl ethers, including vinyl methyl ether, vinyl ketones such as vinyl methyl ketone; N-vinyl indole and N-vinyl pyrrolidene; styrene butadienes, including those disclosed in U.S. Pat. No. 4,560,635, the disclosure of which is totally incorporated herein by reference; mixtures of these monomers; and the like. The resins are present in the toner in any effective amount, typically from about 75 to about 98 percent by weight, preferably from about 90 to about 98 percent by weight, and more preferably from about 95 to about 96 percent by weight. Suitable liquid ink compositions can be prepared by a number of known methods, reference the aforementioned commonly owned an assigned U.S. Patents and references therein, and the aforementioned U.S. Pat. No. 5,084,205. Toner compositions can be prepared by a number of known methods, such as admixing and heating resin, or polymer particles obtained with the processes of the present invention such as water soluble or insoluble styrene butadiene copolymers, colorants, such as pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter. Alternatively, the toner compositions are ground with a fluid bed grinder equipped with a classifier wheel constructed in accordance with the present invention, and then classified using a classifier equipped with a classifier wheel constructed in accordance with the present invention. In embodiments, a toner can be prepared directly, thereby foregoing the extensive particle sizing and separation process by including, for example, a suitable colorant in the miniemulsion droplets prior to polymerization, and thereafter isolating the resulting colored toner particles.

Illustrative examples of resins suitable for toner and developer compositions include linear and branched styrene acrylates, styrene methacrylates, styrene butadienes, vinyl resins, including linear and branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable colorants, such as pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO-Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and preferably in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, more preferably from about 8 to about 12 microns, and most preferably from about 5 to about 8 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared, in embodiments, of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The invention will further be illustrated in the following non limiting Example, it being understood that this Example is intended to be illustrative only and that the invention is not intended to be limited to the materials, conditions, process parameters, and the like, recited herein. Parts and percentages are by weight unless otherwise indicated.

EXAMPLE I

A U.V. fluorescent dye "Coumarin 30" available from Eastman Chemical Co., is diluted at 0.1% by weight in a solution of methanol. The toner, such as a toner comprised of a styrene-butadiene copolymer and a pigment such as carbon black, to be treated is stained in this solution and then allowed to thoroughly dry. The toner, about 3 parts, is then mixed with about 100 parts of magnetic carrier particles comprised of, for example, a resin coated core, to form a conventional two component dry xerographic developer material. The treated toner can be utilized in, for example, one or more Xerox Corporation "Docutech" model electronic reprographic printers or digital copies to provide the aforementioned "controlled access electronic printer" and original documents therefrom. The controlled access electronic printer can, in embodiments, be designated and adapted as the exclusive source of printing of certain images and classes of secured documents within a secure facility, for example, registered documents, that is, where there is a known and limited quantity of the original documents, for example, classified documents within a government facility, such as those documents containing sensitive information. Input document scanners and electronic or light lens reprographic machines, preferably all such machines within the secured facility are fitted with a secure illumination source, for example, a U.V. source with a wavelength emission spectrum of about 300 to about 400 nanometers. In embodiments, the secure illumination source, in this instance a UV source, exposes any document, in addition to and simultaneous with the normal scanning light source, such as known visible or infrared sources. In other embodiments, the secure illumination source, exposes the object document prior to the normal illumination. The sequence of illumination by the secure source and the normal source can be, for example, simultaneous or sequential depending on factors including: the relative beam widths of the secure and normal illumination sources, the relationship of the scan speed and the photoemission spectrum and duration of the photoactive compound selected, and the amount and activity of the photoactive compound selected. The relation between these factors can be readily ascertained and optimized accordingly for selected combinations of replication or reprographic devices and photoactive compounds. Thus, if an attempt is made to scan or copy any of the aforementioned registered documents on scanning or copying machines fitted with the secure illumination source, the effect of the U.V. irradiation upon illumination of the photoactive compound will cause the secure document toner image to, for example, fluoresce, phosphoresce, reversibly or irreversibly bleach, retroreflect, and the like related photon stimulated processes, so that visible wavelength light emission will arise from the ostensibly dark image areas. The light emissions, are preferably similar to the reflected light from the background or white or non image areas of the document. The photosensing means, for example, a photodetector or photoreceptor, within the uncontrolled access scanner or reproduction device will be unable to differentiate between the image and non-image areas of the document thereby rendering the copy machine incapable of making an acceptable copy, or in the case of scanners forming a high fidelity digital representation of the original document. The above situation renders any of the input scanners or reprographic devices within the secure facility incapable of creating satisfactory new copies or digital representations of the sensitive information contained in the aforementioned "original" controlled or registered documents. A low or unacceptable alternative to the aforementioned secure printing process within such a secured facility would be to prohibit the use of any input scanners or reprographic machines for any purpose.

Other modifications of the present invention may occur to one of ordinary skill in the art based upon a review of the present application and these modifications, including equivalents thereof, are intended to be included within the scope of the present invention.

What is claimed is:

1. A method comprising:
providing a controlled access facility with at least one controlled access electronic printing machine;
printing original documents with said controlled access electronic printing machine, wherein printed images formed thereby are recognizable in visible light, and arise from marking materials containing at least one photoactive additive;
equipping all uncontrolled access reprographic devices within said facility with a secure illumination source capable of exposing an object document with sufficient intensity to activate said photoactive additive; and
illuminating said object document with said secure illumination source of said uncontrolled access reprographic device, wherein said object documents having original document images printed thereon cannot be copied or scanned in a normal copy or scan illumination interval, and wherein said illuminating of said object document with said secure illumination source occurs just prior to or during said copy or scan illumination interval of the area of said object document.

2. The method in accordance with claim 1, wherein the reprographic devices are light lens copiers, digital scanning-printing devices, or digital input scanner devices.

3. The method in accordance with claim 1, wherein the recordable image density of said original document is partially or entirely obliterated by the presence of images containing said photoactive additive, and wherein copying or scanning of images containing said photoactive additive on original document images is prevented thereby securing the original documents from unauthorized copying.

4. The method in accordance with claim 1, wherein said object documents that are also original documents are distinguished from non-original documents and wherein the capability to copy original documents is diminished or precluded.

5. The method in accordance with claim 1, wherein said marking materials are liquid inks, dry toners, and combinations thereof.

6. The method in accordance with claim 1, wherein said secure documents are negotiable instruments, or proprietary documents.

7. The method in accordance with claim 1, wherein said controlled access electronic printing machine restricts printing privileges to only authorized individuals.

8. The method in accordance with claim 1, wherein said controlled access electronic printing machine employs a marking engine of dry, or liquid development systems, and combinations thereof.

9. The method in accordance with claim 1, wherein said illuminating of any area of said object document is for an effective time interval of from about 1 millisecond to about 3 seconds, at an effective intensity, and at an effective light wavelength of from about 250 to about 400 nanometers, and wherein the photoactive material in the printed images of said object document is sufficiently excited during said normal copy or scan illumination interval.

10. The method in accordance with claim 1, wherein the photoactive material is a courmarin compound.

11. The method in accordance with claim 1, wherein the printed images are alphanumeric characters, line art, bit maps, pictorial images, graphic images, or combinations thereof.

12. The method in accordance with claim 1, wherein the recordable image density of said object document is unaffected in the absence of images containing said photoactive additive.

13. The method in accordance with claim 1, wherein the secure illumination source cannot be altered or disabled without authorization.

14. The method in accordance with claim 1, wherein the secure illumination source is inaccessible and unalterable by a casual user or operator of said reprographic device.

15. The method in accordance with claim 1, wherein the secure illumination source can be selectively disabled and enabled by selected and authorized individuals.

16. The method in accordance with claim 1, wherein the secure illumination source has wavelengths other than those in the typical human visible region.

17. The method in accordance with claim 1, wherein the absorption spectrum of the photoactive compound becomes lighter or brighter when irradiated in said secure illumination source.

18. The method in accordance with claim 1, wherein the photoactive compound is present in an amount of from about 0.01 to about 50 weight percent based on the total weight of the active toner or ink marking material particles selected for forming said original documents.

19. The method in accordance with claim 1, wherein the photoactive compound is selected from the group consisting of photochromic, fluorescent, phosphorescent, iridescent, retroreflective, and mixtures thereof.

20. The method in accordance with claim 1, wherein the illuminated original document with images containing said photoactive compound produces a visible spectrum which is greater than the visible spectrum than when the photoactive compound is absent.

21. A method comprising:
generating original images with a composition containing at least one photoactive component;
providing reprographic devices with a secure illumination source capable of exposing an object document with sufficient intensity to activate said photoactive additive; and
illuminating said object document with said secure illumination source, wherein said object document is not reproducible in a normal copy or scan illumination interval if said object document contains original image content.

* * * * *